United States Patent
Duttenhöfer

(10) Patent No.: US 10,670,179 B2
(45) Date of Patent: Jun. 2, 2020

(54) LINER TUBE FOR SEWER REHABILITATION AND METHOD FOR PRODUCING SAME

(71) Applicant: Brandenburger Patentverwertung GbR, Landau (DE)

(72) Inventor: Peter Duttenhöfer, Ilbesheim (DE)

(73) Assignee: Brandenburger Patentverwertung GbR, Landau (DE)

( * ) Notice: Subject to any disclaimer, the term of this patent is extended or adjusted under 35 U.S.C. 154(b) by 215 days.

(21) Appl. No.: 15/766,412

(22) PCT Filed: Jul. 22, 2016

(86) PCT No.: PCT/EP2016/001277
§ 371 (c)(1),
(2) Date: Apr. 6, 2018

(87) PCT Pub. No.: WO2017/059936
PCT Pub. Date: Apr. 13, 2017

(65) Prior Publication Data
US 2018/0306372 A1    Oct. 25, 2018

(30) Foreign Application Priority Data

Oct. 6, 2015   (DE) .......... 10 2015 012 852
Oct. 28, 2015  (DE) .......... 10 2015 013 856

(51) Int. Cl.
*F16L 55/165*   (2006.01)
*B29C 53/58*    (2006.01)
(Continued)

(52) U.S. Cl.
CPC ........ *F16L 55/1656* (2013.01); *B29C 53/582* (2013.01); *B32B 1/00* (2013.01);
(Continued)

(58) Field of Classification Search
CPC ..... F16L 55/1656; F16L 55/165; F16L 11/24; B29C 53/58
(Continued)

(56) References Cited

U.S. PATENT DOCUMENTS 5,660,770 A * 8/1997 Wernicke ............ B29B 17/0026
                                                       264/37.28
5,698,056 A * 12/1997 Kamiyama ......... B29C 65/5042
                                                          138/98
(Continued)

FOREIGN PATENT DOCUMENTS

DE      3045036      6/1981
DE      3039764      5/1982
(Continued)

OTHER PUBLICATIONS

Written Opinion in PCT/EP2016/001277 dated Sep. 26, 2016.
(Continued)

*Primary Examiner* — Patrick F Brinson
(74) *Attorney, Agent, or Firm* — Melgar IP Law; Tod M. Melgar

(57) ABSTRACT

A liner tube (1) for rehabilitating sewers and water drainage ducts, with an inner film tube (2), a first layer (4) arranged thereon made of nonwoven material, and a second layer (6) made of glass fiber material and arranged on the layer (4) made of nonwoven material, is characterized in that the first layer (4) contains at least one overlapping wound strip made of nonwoven material, which is impregnated with a fluid reaction resin which can be cured by light or heat, and in that the second layer (6) contains at least one first strip (6a) which is impregnated with a fluid reaction resin and made of glass fiber material, which has glass fibers (8) extending in
(Continued)

the longitudinal direction of the liner tube. The invention furthermore relates to a method for producing a liner tube of this kind.

16 Claims, 1 Drawing Sheet

(51) Int. Cl.
| | |
|---|---|
| F16L 11/24 | (2006.01) |
| B32B 5/02 | (2006.01) |
| B32B 27/32 | (2006.01) |
| B32B 27/34 | (2006.01) |
| B32B 1/08 | (2006.01) |
| B32B 5/26 | (2006.01) |
| B32B 5/08 | (2006.01) |
| B32B 27/08 | (2006.01) |
| B32B 1/00 | (2006.01) |
| B32B 27/06 | (2006.01) |
| B32B 27/16 | (2006.01) |
| B32B 5/24 | (2006.01) |
| B32B 5/22 | (2006.01) |
| B32B 27/12 | (2006.01) |
| F16L 11/12 | (2006.01) |
| B29K 309/08 | (2006.01) |
| B29L 23/00 | (2006.01) |

(52) U.S. Cl.
CPC .......... *B32B 1/08* (2013.01); *B32B 5/02* (2013.01); *B32B 5/022* (2013.01); *B32B 5/08* (2013.01); *B32B 5/22* (2013.01); *B32B 5/24* (2013.01); *B32B 5/26* (2013.01); *B32B 27/06* (2013.01); *B32B 27/08* (2013.01); *B32B 27/12* (2013.01); *B32B 27/16* (2013.01); *B32B 27/32* (2013.01); *B32B 27/34* (2013.01); *F16L 11/12* (2013.01); *F16L 11/24* (2013.01); *F16L 55/1654* (2013.01); *B29K 2309/08* (2013.01); *B29L 2023/22* (2013.01); *B32B 2250/00* (2013.01); *B32B 2250/03* (2013.01); *B32B 2250/04* (2013.01); *B32B 2250/05* (2013.01); *B32B 2260/00* (2013.01); *B32B 2260/021* (2013.01); *B32B 2260/023* (2013.01); *B32B 2260/046* (2013.01); *B32B 2262/00* (2013.01); *B32B 2262/02* (2013.01); *B32B 2262/0246* (2013.01); *B32B 2262/0253* (2013.01); *B32B 2262/0276* (2013.01); *B32B 2262/101* (2013.01); *B32B 2262/14* (2013.01); *B32B 2264/00* (2013.01); *B32B 2264/101* (2013.01); *B32B 2307/41* (2013.01); *B32B 2597/00* (2013.01)

(58) Field of Classification Search
USPC ....... 138/98, 97; 264/269; 156/91, 287, 269, 156/516; 405/150.1
See application file for complete search history.

(56) References Cited

U.S. PATENT DOCUMENTS

| | | | |
|---|---|---|---|
| 5,798,013 A | 8/1998 | Brandenhurger | |
| 7,812,328 B2 | 11/2010 | Betz | |
| 9,829,142 B2 | 11/2017 | Fuechtjohann et al. | |
| 2005/0194718 A1* | 9/2005 | Blades | F16L 55/1656 264/269 |
| 2010/0243091 A1* | 9/2010 | D'Hulster | F16L 55/1651 138/97 |
| 2014/0076448 A1* | 3/2014 | Duttenhoefer | F16L 55/165 138/98 |
| 2016/0131298 A1* | 5/2016 | Schleicher | F16L 55/1656 138/98 |

FOREIGN PATENT DOCUMENTS

| | | |
|---|---|---|
| DE | 102005054 A1 | 5/2007 |
| DE | 102011105592 | 12/2012 |
| EP | 2573442 | 3/2013 |
| WO | 9504646 | 2/1995 |
| WO | 2011/006618 | 1/2011 |

OTHER PUBLICATIONS

ISR in PCT/EP2016/001277 dated Sep. 26, 2016.
DE3039764 Machine translation (abstract only).
DE10201110559 Machine translation.
WO2011006618 Machine translation.
U.S. Pat. No. 5,798,013 English language patent related to WO9504646.
GB2065262 English language patent related to DE3045036.
U.S. Pat. No. 9,829,142 English language patent related to EP2573442.
U.S. Pat. No. 7,812,328 (English language counterpart to DE102005054970).

* cited by examiner

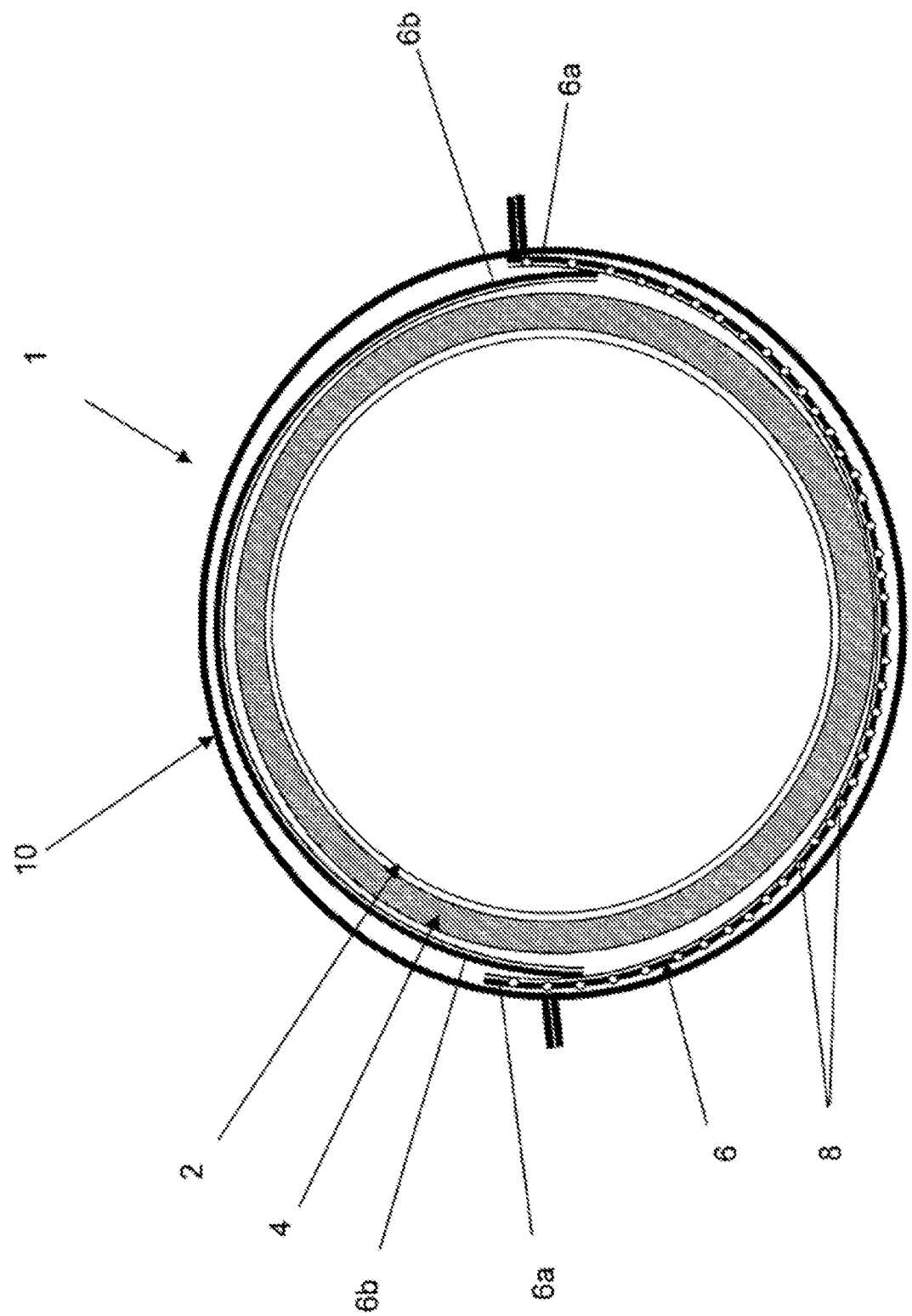

LINER TUBE FOR SEWER REHABILITATION AND METHOD FOR PRODUCING SAME

This application is based on International Application No. PCT/EP2016/001277 filed on Jul. 22, 2016, which claims priority to German Patent Application Nos. DE 10 2015 012 852.3 filed on Oct. 6, 2015 and DE 10 2015 013 856.1 filed on Oct. 28, 2015, the entire contents of which are incorporated herein by reference.

The invention relates to a liner tube for sewer rehabilitation as well as a method for producing the same according to the recited claims.

In the field of trenchless rehabilitation of defective pipelines, such as defective water drainage ducts or waste water sewers, lining tubes are being used increasingly, known as "liners" and consisting of a wound glass fiber textile, which is impregnated with a fluid reaction resin, which after pulling the liner tube into the pipeline and expanding it with the aid of compressed air is cured by means of light or a radiation source.

Such a liner tube which is also called a "glass liner" in the corresponding technical circles and also hereinafter, as well as a method of making such a liner, are known for example from WO-A 95/04646.

Furthermore, it is known to make lining tubes by laying web-like material composed of a nonwoven material such as felt on top of each other, wherein one or more layers of felt or nonwoven material are laid on top of each other in overlapping manner or sewn end to end. The liner tube so produced, which is also called a felt liner in the following, is then impregnated with resin in a duct to be rehabilitated. The resin is introduced into the relatively thick-walled nonwoven material in a complicated process by applying a partial vacuum. While the lining tubes made in this way are favorable by virtue of the nonwoven material, which is more advantageous than glass fiber material, and the absence of a reinforcing fiber fraction, they have a significantly lower strength as compared to lining tubes made from glass fiber material.

Another deficiency of felt liners is the fact that they are made from a prefabricated needled felt tube with a fixed wall thickness and fixed rated diameter, hereinafter called DN. For each wall thickness and each diameter, a specially prepared needled felt tube must be used. Accordingly, no felt liners are known thus far which are produced by winding.

Another problem with felt liners in this context is the fact that, for larger diameters, they require much larger wall thicknesses on account of their low E modulus in order to achieve the required strength values after the curing. Even though the wall thickness of felt liners with a diameter in the range of DN 150 mm to DN 300 mm is only around 4 mm, the wall thickness of felt liners with large diameters, e.g., of more than 500 mm, quickly becomes twice as thick as that of glass liners. Since the felt material furthermore has only very slight transparency to UV light, felt liners are not cured with UV light in practice, but instead with the aid of hot steam or hot water. In this case, special reaction resins are used, which are cured not with UV light, but with heat.

Accordingly, one problem which the invention proposes to solve is to provide a liner tube which on the one hand has an increased strength as compared to the above described felt liners and which on the other hand can be produced much more economically than a liner tube made of glass fiber textile.

A further problem which the invention proposes to solve is to provide a method by which such a liner tube can be produced in an endless process.

These problems are solved according to the invention by the features of the recited claims.

Further features of the invention are described in the dependent claims.

As the applicant has discovered, glass liners with diameters in the range of DN 150 mm to DN 500 mm, especially DN 150 mm to DN 300 mm, are mechanically overdimensioned, since the required minimum wall thickness of such a liner tube is generally 4 mm. The material parameters, such as the long-term E modulus, for this reason lie above the structural requirements demanded by contractors to ensure the necessary stability of a rehabilitated sewer over a lengthy time of, for example, 50 years.

As the applicant has further discovered, the lining tubes in a particular diameter range are more expensive due to this overdimensioning as compared to liners of more favorable materials not having a high E modulus, such as lining tubes made of needled felt.

It has likewise been discovered by the applicant in this context that it is possible, in the case of liners with diameters in the range of DN 150 mm to DN 500 mm and wall thicknesses of 3-8 mm, preferably 4-6 mm, to optimize the production costs with the use of a material combination according to the invention of a wound striplike nonwoven material, especially a pre-impregnated strip of nonwoven material and a glass fiber material wound thereupon, having preferably at least partly continuous glass fibers or glass fiber rovings extending in the longitudinal direction of the liner, without having to accept drawbacks in terms of strength and durability. The glass fiber material may also advantageously contain glass fibers in the circumferential direction, in order to increase the overall strength of the cured liner tube if so desired.

It is a special benefit of the lining tubes according to the invention that they can be produced and installed in the very same way as known glass liners, which are fabricated for example according to the method described in the previously cited WO-A 95/04646 of the applicant making use of a winding tongue. In other words, the solution according to the invention has the benefit that only the first layer of a different material, namely a nonwoven material, especially a striplike plastic nonwoven material, preferably of an economical polyester nonwoven which is transparent to UV light, also known as a laminate, is wound onto the inner film tube. The other steps of the method for the placement of the second glass fiber layer and the packaging arranged around it in the form of an outer film tube may be retained in modified form from the basic principle.

In the solution according to the invention, the liner tube is preferably created in that at least one, but preferably several strips of nonwoven material are wound directly overlapping on the outside of an inner film tube, preferably transparent to UV light. For this, for example, the circumferentially closed inner film tube, optionally provided with a laminated nonwoven layer on its outside, is moved in a familiar manner via a winding tongue of adjustable diameter, around which there moves on a circular trajectory a roller which is pivot-mounted in a winding device, with a strip of nonwoven material, impregnated with reaction resin, rolled up on it.

In the preferred embodiment of the invention, the plastic nonwoven material, i.e., the striplike nonwoven material has a thickness of around 1 mm; wherein, for the production of a liner with a nonwoven layer having a thickness of e.g. 4 mm, in this case four individual strips of nonwoven material are wound overlapping one on another with an axial offset between the layers.

As the applicant has discovered through experiments, the quality/strength of the liner tube according to the invention corresponds, after the curing of the reaction resin, to roughly the quality/strength of a needled felt liner produced in a traditional manner by placement of different layers of needled felt one on top of another.

The liner tube according to the invention has the advantage that, thanks to the winding of the first nonwoven layer onto the inner film tube, which is not known in the prior art, lining tubes with different wall thicknesses and diameters can always be produced from the same striplike nonwoven material, which significantly reduces the logistical expense—and thus the costs—during production. In comparison, known needled felt liners are produced individually each use from a prefabricated needled felt tube with fixed wall thickness and fixed rated diameter. Each use a specially prefabricated needle felt tube must be kept on hand for each wall thickness and each rated diameter.

The longitudinal glass fiber strip is placed as the second layer preferably directly on the first layer, in addition to the strip of nonwoven material impregnated with reaction resin. This has the advantage that the entire construction is stable in the longitudinal direction, so that the liner can be pulled into the sewer with the customary glass liner traction devices known in the prior art. Furthermore, the longitudinal glass fiber strip has the advantage of significantly reducing shrinkage in the circumferential and longitudinal direction, which is common in felt liners.

As a result of the hybrid construction of wound nonwoven layer and longitudinal glass fibers placed thereupon according to the invention, the very low E modulus of the nonwoven material is advantageously combined with the relatively high E modulus of the longitudinal glass fiber strip in the cured liner tube, so that the resulting E modulus is at least high enough for a liner tube with a rated outside diameter DN of 150 to 500 mm and an overall wall thickness of around 4 mm to achieve the mechanical strength parameters usually required.

In the preferred embodiment of the invention, the at least one strip of nonwoven material of the first layer has a thickness between 0.5 mm and 2 mm, preferably 1 mm. The preferred width in this case lies in the range between 200 and 700 mm. The first layer preferably contains at least two separate strips of nonwoven material, one on top of the other. The first layer may have a thickness in the range of 3 mm to 8 mm, and preferably between 4 mm and 6 mm.

It is also possible to use a known reaction resin used in felt liners that are cured by hot steam or hot water and that contain e.g. peroxides, which decompose into radicals at higher temperatures, e.g., above 80° C., and initiate the polymerization. In the preferred embodiment, however, a reaction resin is used which contains photoinitiators that can be cured with light, especially UV light. As the applicant has discovered, with the material pairing for the first and second layer in the wall thickness range according to the invention, the total curing of the nonwoven layer as well as the glass fiber layer is possible in a reliable manner, even though the nonwoven material used for the first layer has a much lower transparency to light as compared to pure glass fiber material. This permits curing lining tubes according to the invention in the manner previously only known for lining tubes made from glass fiber material; i.e. in a significantly shorter time and with substantially lower expense by leading, especially pulling, a UV light source through the interior of the liner tube, which is expanded with the help of compressed air. Such a UV light source is known, for example, from DE102005054970A1.

According to another basic aspect of the invention, the nonwoven material is or contains a plastic nonwoven material, especially a polyester nonwoven material and/or a polyethylene nonwoven material and/or a polyacrylonitrile nonwoven material. The use of a blend of the aforementioned nonwoven materials is likewise conceivable. Additionally, the nonwoven material may contain a small fraction of glass fibers, especially short fibers with a length of, e.g., up to 10 mm, in order to increase the strength of the cured liner tube by a requisite amount if desired.

In this context, it may be of special advantage with regard to production costs when the nonwoven material contains, in particular, nondirectional short fibers of preferably recycled and/or comminuted glass fiber material. As the applicant has discovered, by adding already small amounts of short glass fibers, for example up to 20 wt. % in terms of the total weight of the material of the first layer, a significant boosting of the modulus of elasticity in the circumferential direction of the liner tube can be achieved.

In the preferred embodiment of the liner tube according to the invention, the second layer comprises a first and a second glass fiber strip laid extending in the longitudinal direction of the liner tube and overlapping, preferably a glass fiber textile, which lies directly against the underside of the first wound nonwoven layer, or which is placed from above onto it, after the wound nonwoven layer has emerged from the area of the winding device, in which the rolls of striplike nonwoven material wound around the inner film tube.

To protect the liner tube manufactured in the above described manner according to the invention against the radiation of UV light and thereby prevent a premature curing of the reaction resin, in the preferred embodiment of the invention an outer film tube of a circumferentially stretchable plastic material, nontransparent to light, especially one designed as a composite film of polyethylene, polyamide and polyethylene, is arranged around the second layer. This lies as close as possible against the outside of the second layer and additionally makes sure that the first and second layer do not shift relative to each other when the liner tube is pulled into a sewer being rehabilitated or become damaged by building components which are sticking out.

According to another basic idea of the invention, a method for production of the above described liner tube involves the following steps:

forming a first cohesive nonwoven layer by overlapping helical winding of at least one strip, but preferably of two or more strips, of nonwoven material impregnated with a fluid reaction resin about a circumferentially closed inner film tube, especially one consisting of material transparent to UV light, and arranging at least one strip of glass fiber material impregnated with a fluid reaction resin on the nonwoven layer, containing glass fibers extending in the longitudinal direction of the liner tube.

The method according to the invention has the advantage that the diameter and the wall thickness of the liner tube according to the invention can be easily changed by simply adjusting the diameter of the winding tongue used for the winding process radially to the desired rated diameter and winding a number of strips of nonwoven material with a given thickness, corresponding to the wall thickness of the liner tube, around the inner film tube. Unlike the previously mentioned fabrication of felt liners, it is not required in this case to cut the nonwoven material individually to size corresponding to the desired diameter of the liner tube, which significantly reduces the logistical expense as well as the labor cost.

In the preferred embodiment of the method according to the invention, the strip of nonwoven material is impregnated with the reaction resin advantageously prior to the winding. This may be done, for example, by pulling the strip through a tank filled with resin before it is wound up into a roll and removing the excess material.

The invention shall now be described with reference to the drawings with the aid of preferred embodiments.

The drawings show:

FIG. 1 a schematic cross section view of the liner tube according to the invention.

As is shown in the representation of FIG. 1, a liner tube 1 for the rehabilitation of sewers and drainage lines, not otherwise shown, comprises an inner film tube 2, on whose outside is placed a first layer 4 of a striplike nonwoven material, especially a felt or polyester nonwoven material. For putting the first layer 4 in place, a winding device not otherwise shown is used, such as that described for example in WO-A 95/04646 of the applicant. Next, there is placed on the at least one layer 4 of striplike nonwoven material, a second layer 6 in the form of a first strip 6a of glass fiber material, impregnated with a fluid reaction resin, having glass fibers 8 extending in the longitudinal direction of the liner tube. The first strip 6a of glass fiber material is preferably a glass fiber textile, which preferably likewise possesses glass fibers running in the transverse direction to the glass fibers 8, not being otherwise shown in the figure. The first strip 6a of glass fiber material is preferably arranged, after the winding of the first layer 4 of nonwoven material, directly on its underside and serves preferably as a lengthwise traction strip, on which the liner tube 1 is pulled into a sewer being rehabilitated.

As can be further seen from the representation of FIG. 1, a second strip 6b of glass fiber material is furthermore arranged on the top side of the first nonwoven layer 4, preferably likewise being a glass fiber textile, and overlapping the first strip 6a at both ends in a range of, e.g., 30 to 50 mm.

In the preferred sample embodiment of the invention, an outer film tube 10 is preferably arranged around the second layer 6, which is at least nontransparent to the particular light wavelength used in the case of reaction resins which are cured by irradiation with light, especially UV light.

Furthermore, in an embodiment of the invention not otherwise shown, a further protective tube of tear-resistant material can be arranged around the outer film tube 10, having a circumferentially stretchable section extending along the length of the protective tube, which is circumferentially shortened when the tube is pulled into the sewer and only expands circumferentially upon expanding of the liner tube 1 with the aid of compressed air, making possible a radial expansion of the first and second layer 4, 6, so that the outside of the liner tube 1 may lie against the inner wall of the sewer during the curing.

LIST OF REFERENCE NUMBERS

1 Liner tube
2 Inner film tube
4 First layer of striplike nonwoven material
6 Second layer of glass fiber material
6a First strip of glass fiber material
6b Second strip of glass fiber material
8 Glass fibers running in the longitudinal direction of the liner tube
10 Outer film tube

The invention claimed is:

1. A liner tube for rehabilitating sewers and water drainage ducts, comprising:
   an inner film tube,
   a first layer made of nonwoven material arranged on the inner film tube, and
   a second layer made of glass fiber material arranged on the first layer,
   wherein the first layer contains at least one overlapping wound strip made of nonwoven material, impregnated with a fluid reaction resin that can be cured by light or heat, and
   wherein the glass fiber material of the second layer comprises a first and a second overlapping laid glass fiber strip composed of a glass fiber textile, wherein at least one of the laid glass fiber strips is impregnated with a fluid reaction resin, and wherein the at least one glass fiber strip comprises glass fibers extending in the longitudinal direction of the liner tube.

2. The liner tube according to claim 1, wherein the at least one strip of nonwoven material of the first layer has a thickness between 0.5 mm and 2 mm, and a width between 200 and 700 mm, and/or the first layer contains at least two separate strips of nonwoven material one on top of the other.

3. Liner tube according to claim 1, wherein the first layer has a thickness in the range of 3 mm and 8 mm.

4. The liner tube according to claim 1 wherein the reaction resin is a reaction resin cured by UV light.

5. The liner tube according to claim 1 wherein the nonwoven material is or contains a plastic nonwoven material.

6. The liner tube according to claim 1 wherein the nonwoven material contains glass fibers.

7. The liner tube according to claim 1, further comprising an outer film tube of a circumferentially stretchable plastic material, arranged around the second layer.

8. A method for producing a liner tube comprising:
   forming a first cohesive nonwoven layer by overlapping helical winding of at least one strip of nonwoven material impregnated with a fluid reaction resin about a circumferentially closed inner film tube and arranging a first and a second overlapping strip of glass fiber material composed of a glass fiber textile on the nonwoven layer, wherein at least one strip of the glass fiber material is impregnated with fluid reaction resin, and wherein at least one strip of glass fiber material comprises glass fibers extending in the longitudinal direction of the liner tube.

9. The method according to claim 8, wherein the strip of nonwoven material is impregnated with the reaction resin prior to the winding.

10. The method of claim 8, wherein the first cohesive nonwoven layer is transparent to UV light.

11. The method of claim 8, wherein the majority of glass fibers in the at least one strip of glass fiber material are oriented in the longitudinal direction of the liner tube.

12. The liner tube according to claim 5 wherein the nonwoven material is or contains a plastic nonwoven material comprising at least one of a polyester nonwoven material and/or a polyethylene nonwoven material and/or a polyacrylonitrile nonwoven material.

13. The liner tube according to claim 6 wherein the nonwoven material contains glass fibers comprising nondirectional short fibers of recycled and/or comminuted glass fiber material.

14. The liner tube according to claim 7, wherein the outer film tube of a circumferentially stretchable plastic material is not transparent to light, especially a composite film of polyethylene, polyamide and polyethylene, is arranged around the second layer.

15. The liner tube according to claim 14, wherein the stretchable plastic material is a composite film of polyethylene, polyamide or polyethylene.

16. A liner tube for rehabilitating sewers and water drainage ducts, comprising:
- an inner film tube,
- a first layer made of nonwoven material arranged on the inner film tube, and
- a second layer made of glass fiber material arranged on the first layer,
- wherein the first layer contains at least one overlapping wound strip made of nonwoven material, impregnated with a fluid reaction resin that can be cured by light or heat, and the nonwoven material contains glass fibers comprising non-directional short fibers of at least one of recycled or comminuted glass fiber material, and
- wherein the second layer comprises at least one strip made of glass fiber material and impregnated with a fluid reaction resin, and wherein the at least one strip made of glass fiber material comprises glass fibers extending in the longitudinal direction of the liner tube.

* * * * *